Aug. 5, 1969  YASUO TAKAHASHI  3,459,469

LENS SYSTEM

Filed Nov. 2, 1966

INVENTOR.
YASUO TAKAHASHI
BY Stanley Wolder
ATTORNEY

United States Patent Office 3,459,469
Patented Aug. 5, 1969

3,459,469
LENS SYSTEM
Yasuo Takahashi, Tokyo-to, Japan, assignor to Asahi Kogaku Kogyo Kabushiki Kaisha, Tokyo-to, Japan, a corporation of Japan
Filed Nov. 2, 1966, Ser. No. 591,574
Claims priority, application Japan, Nov. 4, 1965, 40/67,249
Int. Cl. G02b 9/60
U.S. Cl. 350—223       1 Claim

ABSTRACT OF THE DISCLOSURE

A telephotographic objective wherein advantageously the first lens is negative with a concave rear face and the second lens is positive with a convex front face mating said first lens rear face to form a compound lens group, the third lens is positive with its front face of greater curvature than its rear face, the fourth lens is negative with a rear face of greater curvature than its front face, and the fifth lens is positive with a front face of greater curvature than its rear face.

---

The present invention relates generally to improvements in optical systems and it relates particularly to an improved long focus or telephoto lens system for use as an objective lens in photography or the like.

The conventional long focus or telephoto objective lens systems employed in photography possess many drawbacks and disadvantages. They are complex expensive devices which are not only difficult to manufacture but are usually of an optical quality which leaves much to be desired. These lenses usually represent a compromise between brightness and efficiency, one of the properties being improved at the sacrifice of the other.

It is therefore a principal object of the present invention to provide an improved optical system.

Another object of the present invention is to provide an improved long focal length lens system.

Still another object of the present invention is to provide an improved photographic telephoto lens system.

A further object of the present invention is to provide a lens system of the above nature characterized by its superior optical properties including brightness, efficiency, minimum chromatic and spherical aberration, distortion and astigmatism, its versatility, adaptability and low cost.

Figure 1:
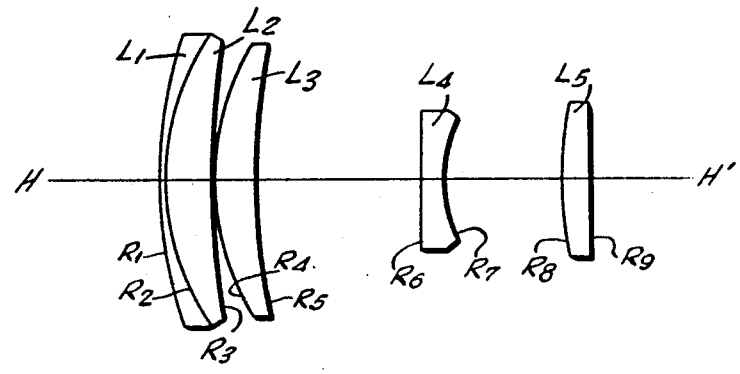
Figure 2:
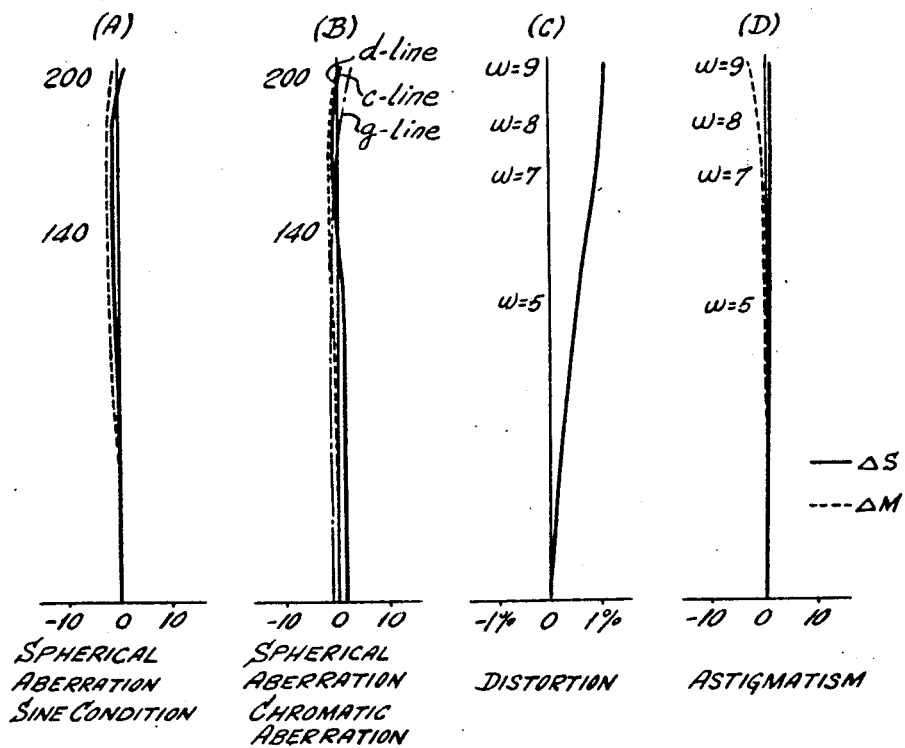

The above and other objects of the present invention will become apparent from a reading of the following description taken in conjunction with the accompanying drawings, wherein:

FIGURE 1 is a longitudinal sectional view of a telephoto lens system embodying the present invention; and FIGURES 2(A) to 2(D) are sets of curves illustrating the spherical aberration and sine condition, the chromatic and spherical aberration, the distortion, and the astigmatism of the specific lens system illustrated in FIGURE 1.

In a sense the present invention contemplates the provision of a telephoto objective lens system comprising five lenses designated consecutively from front to rear as the first to the fifth lens and having the following parameters:

(I)           $F/2.1 < F_{1,2,3} < F/1.6$
(II)          $F/0.7 < F_{1,2,3,4} < F/0.35$
(III)            $0.17F < R_7$
(IV)            $0.3F < R_8 < \infty$
(V)           $0.18F < l_2 \leqq 0.3F$ wherein F is the focal length of said lens system, $F_{1,2,\ldots n}$ is the resultant focal length of the subscript designated lenses, $R_7$ is the radius of the rear face of the fourth lens, $R_8$ the radius of the front face of the fifth lens, and $l_2$ is the axial distance between the confronting faces of the third and fourth lens. Advantageously the first lens is negative with a concave rear face and the second lens is positive with a convex front face mating said first lens rear face to form a compound lens group, the third lens is positive with its front face of greater curvature than its rear face, the fourth lens is negative with a rear face of greater curvature than its front face, and the fifth lens is positive with a front face of greater curvature than its rear face.

Referring now to the drawing, and particularly FIGURE 1 thereof which illustrates a preferred embodiment of the present invention, the improved telephoto lens system includes five coaxially arranged lenses $L_1$, $L_2$, $L_3$, $L_4$ and $L_5$ respectively, arranged consecutively from the front to the rear, the front face of the front lens $L_1$ being designated $R_1$ and directed toward the object H and the rear face $R_9$ of the fifth lens $L_5$ being directed toward the image H'. The rear face of first lens $L_1$ and the front face of the second lens $L_2$ are in mating engagement and delineate a common face or surface $R_2$. The remaining lens faces, from the rear face of the second lens $L_2$ to the rear face of the fifth lens $L_5$, are designated consecutively $R_3$, $R_4$ ... $R_9$.

The first lens $L_1$ is a negative lens and is cemented to the positive second lens $L_2$ along their confronting mating faces $R_2$ to form a unit group functioning as a single positive lens. The third lens $L_3$, a single element lens, is a positive lens with its front face $R_4$ of larger curvature of greater curvature than its rear face $R_5$. The fourth lens $L_4$, a single element lens is a negative lens with its rear face $R_7$ of larger curvature than its front face $R_6$. A diaphragm (not shown) is positioned between the fourth lens $L_4$ and the fifth lens $L_5$ which is a single element lens and is a positive lens with its front face $R_8$ of large curvature than its rear face $R_9$. Thus, the lens system is composed of four lens groups consisting of five lenses.

With the present lens system, under the conditions I through V hereinafter set forth correction of the various aberrations which are encountered in telephotographic objectives is achieved in an excellent manner. Generally, an increase of the positive lens power of the leading lens group to increase telephotographic efficiency results in aggravation of chromatic aberration as well as other aberrations. In order to eliminate such disadvantage, in accordance with the present invention, the first lens group, consisting of the first and the second lenses $L_1$ and $L_2$ which are cemented to each other, is so arranged as to be excessively corrected with respect to chromatic aberration, thereby also to eliminate the undercorrected condition of the second lens group or the third lens $L_3$.

The telephotographic efficiency is increased by the increased distance between the third lens $L_3$ and group or fourth lens $L_4$, and further, under the conditions I and II the arrangement is so effected that the increase of telephotographic efficiency will not cause any difficulty in the correction of chromatic aberration.

The aforementioned conditions I through V are as follows:

(I)           $F/2.1 < F_{1,2,3} < F/1.6$
(II)          $F/0.7 < F_{1,2,3,4} < F/0.35$
(III)            $0.17F < R_7$
(IV)            $0.3F < R_8 \leqq \infty$
(V)           $0.18F < l_2 < 0.3F$ In the optical system of the above mentioned construction according to the present invention, the resultant focal length of the entire system is F, the resultant focal length of the first through the $i$th lenses is $F_i$ ($i=1, 2, \ldots, 5$), the radius of curvature of the $j$th surface is $R_j$ ($j=1$, 2, ..., 9), and $l_2$ is the spacing between the confronting faces of the third and fourth lenses $L_3$ and $L_4$. The above conditions I, II and V are restrictive requirements for a telephotographic objective, the condition I in association with the condition II determines the lens power allocation for assuring the aberration balance. The condition II assures the chromatic aberration balance, and further determines astigmatism and telephotographic efficiency. When it is determined that $F_{1,2,3}$ be $F/2.1$, to determine $F_{1,2,3,4}$ to be smaller than $F/0.7$ would be advantageous with respect to telephotographic efficiency but it would be detrimental to correction of astigmatism. Thus the condition II determines the necessary range. Also, the condition II in association with the condition III prevents the aggravation of coma aberration, determines the relation between $R_6$ and $R_7$, and further determines the allocation of Seidel coefficient $S_3$.

If $S_3$ of $R_7$ as indicated in the condition III is of such negative value as is more than necessary, then the radius of curvature must be smaller, which results in aggravation of coma aberration. Accordingly the condition IV is necessary for compensating this disadvantage. Thus, with $R_8$ sharing the negative value of $S_3$, good astigmatism correction can be carried out. The value of $R_8$ which is smaller than $0.3F$ would increase negative distortion aberration, causing trouble in practical use.

The following example of a lens system according to the present invention is given by way of illustration, the lens system having a focal length F of 1000 mm.:

|  | I |  | II |  | III |
|---|---|---|---|---|---|
| $R_1$ | 600.000 | $d_1$ | 8.00 | $n_1$ | 1.74077/27.7 |
| $R_2$ | 340.800 | $d_2$ | 72.00 | $n_2$ | 1.64000/60.2 |
| $R_3$ | 2,524.444 | $d_3$ | 2.00 |  |  |
| $R_4$ | 346.000 | $d_4$ | 55.04 | $n_3$ | 1.61025/56.5 |
| $R_5$ | 1,111.111 | $d_5$ | 222.22 |  |  |
| $R_6$ | ∞ | $d_6$ | 35.04 | $n_4$ | 1.72000/43.7 |
| $R_7$ | 200.000 | $d_7$ | 160.00 |  |  |
| $R_8$ | 404.711 | $d_8$ | 40.00 | $n_5$ | 1.72000/43.7 |
| $R_9$ | 7,919.900 |  |  |  |  | wherein column I specifies the radii of curvature of the correspondingly designated lens faces, column II specifies the distances $d_1, d_2, \ldots d_8$ between the subscript designated lens faces $R_1, R_2, \ldots R_8$ and the next successive lens faces the column III specifies the indices of refraction $n_1, n_2 \ldots n_5$ of the subscript designated lenses $L_1, L_2 \ldots L_5$ and their Abbé values.

The Seidel coefficients of the above example are as follows:

|  | $S_1$ | $S_2$ | $S_3$ | P | $S_4$ |
|---|---|---|---|---|---|
| 1 | 1.119 | 0.674 | 0.405 | 0.706 | 0.669 |
| 2 | −0.838 | −0.224 | −0.059 | −0.103 | −0.043 |
| 3 | 0.034 | −0.109 | 0.353 | −0.154 | −0.644 |
| 4 | 0.862 | 0.489 | 0.277 | 1.091 | 0.777 |
| 5 | 1.053 | −0.988 | 0.927 | −0.339 | −0.551 |
| 6 | −2.010 | 1.030 | −0.527 | 0.000 | 0.270 |
| 7 | −0.231 | −0.530 | −1.212 | −2.085 | −7.544 |
| 8 | −0.004 | −0.040 | −0.359 | 1.030 | 5.996 |
| 9 | 0.190 | −0.217 | 0.247 | −0.052 | −0.222 |
| SUM | 0.174 | 0.083 | 0.053 | 0.093 | −1.292 |

The characteristics of the lens system described above are shown in FIGURES 2(A) and 2(D) of the drawing.

While there has been described and illustrated a preferred embodiment of the present invention, it is apparent that numerous alterations, omissions and additions may be made without departing from the spirit thereof.

What is claimed is:

1. A telephoto objective lens system of focal length F comprising five lenses designated from front to rear as the first to the fifth lens and having the following dimensions:

| $R_1$ | 0.600000F |  |  |  |  |
|---|---|---|---|---|---|
|  |  | $d_1$ | .00800F | $n_1$ | 1.74077/27.7 |
| $R_2$ | 0.340800F |  |  |  |  |
|  |  | $d_2$ | .07200F | $n_2$ | 1.64000/60.2 |
| $R_3$ | 2.524444F |  |  |  |  |
|  |  | $d_3$ | .00200F |  |  |
| $R_4$ | 0.346000F |  |  |  |  |
|  |  | $d_4$ | .05504F | $n_3$ | 1.61025/56.5 |
| $R_5$ | 1.111111F |  |  |  |  |
|  |  | $d_5$ | 0.22222F |  |  |
| $R_6$ | ∞ |  |  |  |  |
|  |  | $d_6$ | .03504F | $n_4$ | 1.72000/43.7 |
| $R_7$ | 0.200000F |  |  |  |  |
|  |  | $d_7$ | 0.16000F |  |  |
| $R_8$ | 0.404711F |  |  |  |  |
|  |  | $d_8$ | .04000F | $n_5$ | 1.72000/43.7 |
| $R_9$ | 7.919900F |  |  |  |  | wherein $R_1$ is the radius of curvature of the front face of the first lens, $R_2$ is the radius of curvature of the rear face of the first lens and the front face of the second lens, $R_3 \ldots R_9$ are the radii of curvature of the rear face of the second lens to the rear face of the fifth lens respectively, $d_1$ is the axial distance between the front and rear faces of the first lens, $d_2$ is the axial distance between the front and rear faces of the second lens and $d_3 \ldots d_8$ are the axial distances between lens faces from the rear face of the second lens to the rear face of the fifth lens respectively, and $n_1 \ldots n_5$ are the indices of refraction of the corresponding subscript designated lens, and their Abbé values, said first and second lenses being joined to form a single lens group.

References Cited

UNITED STATES PATENTS 2,394,959  2/1946  Wynne _____ 350—223 X

FOREIGN PATENTS 641,069  8/1950  Great Britain.

JOHN K. CORBIN, Primary Examiner